Figure 1:
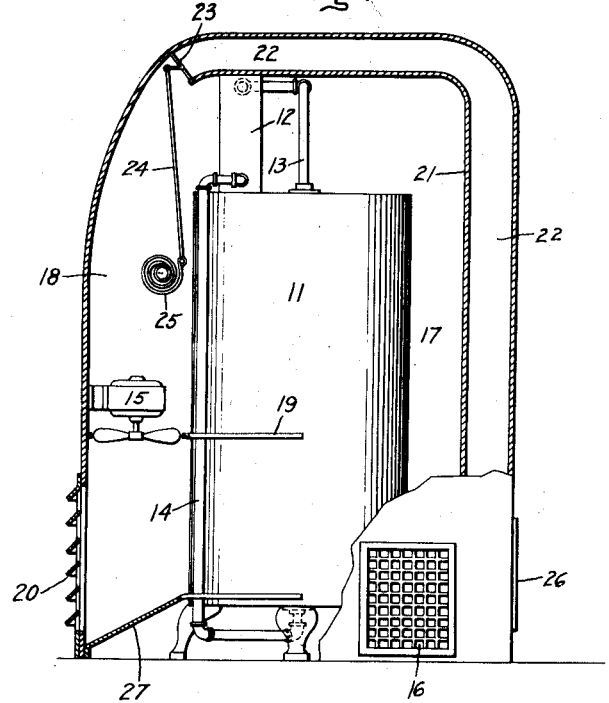

May 14, 1935.  C. I. HALL  2,001,531
HEATING APPARATUS
Filed Feb. 18, 1932

Inventor:
Chester I. Hall,
by Charles V. Tullar
His Attorney.

Patented May 14, 1935

2,001,531

UNITED STATES PATENT OFFICE 2,001,531

HEATING APPARATUS

Chester L. Hall, Philadelphia, Pa., assignor, by mesne assignments, to General Electric Company, a corporation of New York Application February 18, 1932, Serial No. 593,785

2 Claims. (Cl. 237—2)

My invention relates to room air heating apparatus; more particularly to a heat storing and circulating device and control therefor for regulating the circulation of the heated room air therefrom.

There has lately been developed a heating apparatus in which heat is stored at relatively high temperatures in some heat storage medium, by electricity during off-peak hours, this heat being made available by the regulating means during all periods of the day and night. Some of these devices have been built as units and are provided with a radiator against which room air is blown and thereby heated. The fan or blower is thermostatically controlled by means of devices responsive to the temperature of the room air.

One difficulty of such an apparatus is that the room air which comes into contact with the heater or radiator leaves the heating apparatus at extremely high temperatures. This causes an unevenness in the heating of a room as the high temperature air quickly rises above the cooler air near the floor. Further, the relatively hot air leaving the heat unit makes it undesirable and quite uncomfortable for heating purposes since it is forced quickly into the room by the fan.

Hence it is the principal object of my invention to provide a room air heating unit in which the temperature of the air leaving the unit is maintained at a predetermined desired temperature adjacent the floor.

More specifically it is an object of my invention to provide a heat storage radiator unit of the above type in which the air heated to a high temperature by the radiator and cooler air are mixed to provide air of a predetermined temperature leaving the heating unit adjacent the floor.

Although my invention can be applied to other types of heaters, in the preferred embodiment of my invention I provide a casing in which is mounted a heat storage tank which may be heated electrically or otherwise. Mounted on the top of this heat storage tank is a heater or radiator connected to the tank so that a circulation of the heating medium which may be water can pass through the radiator. A blower is provided for taking air at the floor level from the room to be heated and causing it to flow over and through the heater unit.

The casing is so constructed that the heater mounted on top of the heat storage tank is above an outlet from the casing and to one side of what may be termed a mixing chamber adjacent the outlet. An air duct having an intake opening at the floor level conducts air at the floor level room temperature past the heater to the mixing chamber.

The outlet from this air duct is closed by means of a valve controlled by a thermostatic element placed within the mixing chamber. Air passing through and over the heater coming into contact with the thermostatic element affects the same to open the valve in the cold air duct thereby permitting the cold and hot air to mix to bring about a predetermined temperature of the air leaving the mixing chamber of the casing adjacent the floor.

Figure 2:
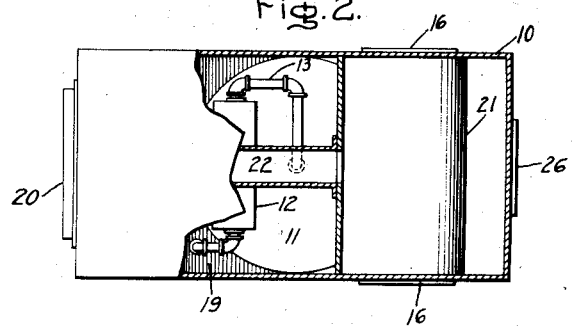

Referring to the drawing, Fig. 1 shows a cross-section of my heating apparatus and Fig. 2 shows a top view thereof with a portion of the casing broken away to show the interior arrangement.

In Fig. 1 the enclosing casing 10 provided with the outlet louvres 20 has mounted therein the heat storage tank 11 so as to form a vertical dividing wall therein with the radiator 12 at the top of the wall. The heat storage medium within this tank may be a liquid adapted to be heated to a relatively high temperature so as to obtain the maximum storage capacity. The heating medium within the heat storage tank may be heated by electricity during off-peak hours or by some other means. Connected to the heat storage tank and mounted on the top thereof is the heater or radiator 12 connected to the tank by means of the intake pipe 13 and outlet or return pipe 14 so that a thermosiphon circulation of the heat storage medium from the tank 11 to radiator 12 occurs as the heat is removed from the storage medium in the radiator.

A forced draft fan 15 is mounted in the mixing chamber 18 which extends downwardly from the radiator 12 to the air outlet 20. This fan causes air at the floor level to be drawn through the grilled openings 16 and to flow upwardly through the space 17 and over the heater 12 to the mixing chamber 18 and then downwardly to the air outlet 20. This air after contacting with the radiator 12 is at a relatively high temperature.

An inner wall 21 forms a passage 22 in the back of the casing 10 which takes in air at the floor level temperature through the grilled opening 26. A valve 23 controls the outlet opening from the passage 22 and is connected by means of link 24 to the thermostatic element 25 mounted in the mixing chamber. A sloping baffle member 27 at the bottom of the mixing chamber 18 prevents the air from being circulated within the casing and causes the air from the mixing chamber 18 to flow outward through the louvres 20 when the fan 15 is operating. The baffle member 19 is provided with an orifice for the fan 15 and prevents undesirable circulation within the mixing chamber.

The thermostatic element 25 in response to the temperature of the air flowing through the radiator 12 expands and opens the valve 23 to admit cold air into the mixing chamber 18. The position of the valve is determined by the temperature of the air from the radiator 12 and is moved to such a position that the mixture of the cooler air from the air duct 22 and the hot air from the radiator 12 will form a mixture of a predetermined temperature leaving the louvres 20, the outlet supporting the louvres 20 being near the floor upon which the heating apparatus is mounted. The louvres, as will be observed, are directed downwardly which causes the mixed air to be directed downwardly and outwardly over the floor of the room in which the heating apparatus is placed.

In this way a positive circulation of the air within the room to be heated is brought about and the entire air content of the room heated to the desired temperature with no portion of the room hotter than the other and without the undesirable feature of extremely hot air leaving the heater unit.

Due to the inverted U shape of the passage for conducting air to the radiator from the floor and from the radiator to the outlet, and to the fact that the outlet from the heating means is near the floor, when the fan 15 is not operating an air lock is provided which prevents air from being circulated through the radiator by natural draft. This is due of course to the fact that cold air settles to the floor forcing warmer air to rise.

While I have described my invention in concrete form and as operating in a specific manner in accordance with the provisions of the patent statutes, it should be understood that I do not limit my invention thereto since various modifications thereof will suggest themselves to those skilled in the art without departing from the spirit of my invention, the scope of which is set forth in the appended claims.

What I claim as new and desire to secure by Letters Patent of the United States is:

1. A room air heating unit comprising an enclosing casing having its bottom near the floor and provided with spaced apart openings adjacent the bottom thereof for admitting and exhausting air, a high temperature heat storage means mounted within said casing to provide a vertical dividing wall between said openings, a radiator mounted at the top of said heat storage means and connected to be heated thereby, means including a fan for circulating air through one of said openings at one side of said wall over said radiator to be heated to a high temperature and exhausted through the other opening, a mixing chamber for receiving the air after passing over said radiator, an air duct in the casing for conducting air at room temperature through an opening at said one side of said wall to said mixing chamber, a valve controlling the admission of said room temperature air through said air duct to said mixing chamber, and a thermostatic element responsive to the temperature of the air in said mixing chamber for controlling said valve to provide an air mixture of a predetermined temperature in said mixing chamber.

2. A room air heating unit comprising an enclosing casing having its bottom near the floor, a tank for containing a high temperature heat storage liquid mounted within said casing to form a vertical dividing wall therein, a radiator mounted on top of said tank and connected to be heated by thermo-siphon action of the heat storage liquid in said tank, air inlet means mounted adjacent the bottom of the casing at one side of said tank, a fan mounted on the other side of said tank for drawing air through said radiator, an air duct for conducting air from said one side of said tank to the other side of said tank without contact with said radiator, a thermostatic valve responsive to the temperature of the air on the other side of said tank for controlling the flow of air through said air duct to provide a mixture of air on the other side of said tank of a predetermined temperature, and air outlet means mounted adjacent the bottom of the casing on the other side of said tank whereby when said fan is inoperative, circulation of air through said radiator is prevented.

CHESTER I. HALL.